US006980660B1

(12) United States Patent
Hind et al.

(10) Patent No.: US 6,980,660 B1
(45) Date of Patent: Dec. 27, 2005

(54) METHOD AND APPARATUS FOR EFFICIENTLY INITIALIZING MOBILE WIRELESS DEVICES

(75) Inventors: John Raithel Hind, Raleigh, NC (US); Marcia Lambert Peters, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/316,804

(22) Filed: May 21, 1999

(51) Int. Cl.[7] .............................................. H04L 9/00
(52) U.S. Cl. ..................... 380/282; 380/277; 380/278; 380/279; 713/168; 713/173; 713/175; 713/201
(58) Field of Search ............................... 713/168–175, 713/155–159, 200–201; 380/247–285

(56) References Cited

U.S. PATENT DOCUMENTS

| | | | |
|---|---|---|---|
| 5,621,798 A | | 4/1997 | Aucsmith |
| 5,774,552 A | * | 6/1998 | Grimmer .................... 713/156 |
| 5,949,877 A | * | 9/1999 | Traw et al. .................. 713/171 |
| 6,178,409 B1 | * | 1/2001 | Weber et al. .................. 705/79 |
| 6,233,577 B1 | * | 5/2001 | Ramasubramani et al. .... 707/9 |
| 6,314,521 B1 | * | 11/2001 | Debry ......................... 713/201 |
| 6,542,610 B2 | * | 4/2003 | Traw et al. .................. 380/262 |

FOREIGN PATENT DOCUMENTS

DE        19730301     7/1997 ............. H04L 9/32

OTHER PUBLICATIONS

Netscape Communications Corp., "Netscape Certificate Server FAQ" web page: www.ast.cam.ac.uk/~rgm/scratch/inetsell/suitespt/faqs/crtfcfaq.htm, Mar. 5, 1997, entire page.*
Hammond, J., et al, "Wireless Hotspot Deployment Guide", Intel Corp., Sep. 2004, #304197-001, entire document, www.intel.com/business/bss/infrastructure/ wireless/deployment/hotspot.pdf.*
Dharmadhikari, A., et al, "SIM Based WLAN Authentication for Open Platforms", The Business Forum, Intel Corp., 2002, entire document, www.bizforum.org/whitepapers/intel-2.htm.*
BlackBerry, "E-Goverment Workshop 2004, Blackberry Presentation", BlackBerry Corp., Nov. 16, 2004, entire document, www.saccounty.net/itpb/ e-governmentworkshop/docs/Blackberry-RIM.pdf.*
Rush, S., "BlackBerry Enterprise Server Gets A Facelift", Reed Business Information, WirelessWeek.com, Nov. 30, 2004, entire document, www.wirelessweek.com/index. asp?layout=document& doc_id=1340002280&verticalID=34&vertical=Busin . . .*

* cited by examiner

*Primary Examiner*—Gregory Morse
*Assistant Examiner*—Ronald Baum
(74) *Attorney, Agent, or Firm*—Winstead Sechrest & Minick

(57) ABSTRACT

A method and system for enabling wireless devices distributed throughout an enterprise to be efficiently initialized for secure communications. The method and system utilize well known public key cryptography and machine unique identifiers to establish a secure channel and initialize the wireless devices.

16 Claims, 9 Drawing Sheets

1005

1001

1003

1080 Send Cert. & Keys, Disconnect

Store Signed Certificate and Public Key 1085

Store Private Key 1090 as Protected Value

Delete PIN 1095

Delete PIN

METHOD AND APPARATUS FOR EFFICIENTLY INITIALIZING MOBILE WIRELESS DEVICES

RELATED PATENTS

The present application entitled "Method and Apparatus for Initializing Mobile Wireless Devices" is related to other United States patent applications filed concurrently herewith, and specifically to the applications entitled "Method and Apparatus for Efficiently Initializing Secure Communications Among Wireless Devices," application Ser. No. 09/316,805 filed May 21, 1999 and "Method and Apparatus for Exclusively Pairing Wireless Devices," application Ser. No. 09/316,686 filed May 21, 1999. All of these applications are assigned to the assignee of the present invention.

The present invention relates generally to security management for wireless devices and more particularly to creating a secure, short-range network for securely transmitting information among wireless devices.

BACKGROUND

The proliferation of wireless devices in computer networks has created a significant problem in the synchronization and secure interconnection of devices. Most wireless devices today are digital, using radio waves to communicate. A typical professional utilizing wireless devices today has a pager which receives digital messages, a digital cellular phone and a notebook computer with a wireless modem to retrieve and send e-mail. To connect to the office or other networks requires special hardware (such as adapter cards having transmission mechanisms) designed to connect to a wide-area or local-area network, which will then allow wire line access to the resources that the professional worker is accustomed to accessing.

A standard has been proposed for the merger of mobile communications with mobile computing. This standard, referred to herein as 'Bluetooth', proposes the incorporation of a small, inexpensive radio into every mobile device. Since this radio is designed to a standard, the mobile device and radio combination can then be optimized to reduce interference. The optimization is feasible since there is a common wireless protocol implemented in a single radio frequency band, rather than the multitude of optional devices using diverse technologies in various radio frequency bands available for wireless access today. The small, low-powered radio is intended for distribution in a module or chip that will communicate with other 'Bluetooth' enabled products. The Bluetooth standard is defining the communications between two selected devices and/or multiple selected devices. Further information regarding the Bluetooth standard is available at their website at http://www.bluetooth.com.

The standard currently defines the use of an available, unlicensed 2.4 GHz radio band that can support both voice and data exchange. While numerous commonly agreed-upon radio frequencies would work, this particular portion of the radio spectrum appears to be available worldwide for low-power unlicensed use. With a 0-dBm transmitter, this low-powered radio will be effective to establish networks of devices within about a 10 meter radius, with rapid degradation as the distance increases. With a 20-dBm transmitter the effective radio range will be about 100 meters. The low-powered radio module is intended to be built into mobile computers, mobile phones, 3-in-1 phones, printers, fax machines, modems, network interfaces (such as LAN or WAN connections), digital cameras, pagers, headphones, etc. Speeds of up to 721 Kbps for asymmetrical asynchronous data transmission, or up to three isochronous 64 Kbps voice channels, or a combination of voice and data channels totaling less than 1 Mbps symbol rate per picocell, are currently supported by the specification, and it is expected that the communication speeds will increase as the technology advances. Because Bluetooth uses frequency-hopping, several uncoordinated picocells can coexist within radio proximity of each other.

While this specification describes a major leap in the ability of devices to interact, there is still a significant problem with the establishment of secure channels for the devices. The specification allows the hand held or wireless devices to connect into what we will term a "piconet" or "picocell". The picocell is just a physically proximate (or small) network. This piconet replaces cables for interconnecting physically proximate devices (within the above-described radio range). An 'access point' (or wireless device) with a Bluetooth radio can attach a picocell to an enterprise LAN or WAN. Deploying these new devices in an enterprise uncovers several unique security and management issues.

Prior art in this area, such as the above specification, defines methods for authentication and encryption at the baseband (physical) layer of the device, but these methods have heretofore-unrecognized limitations, which will be analyzed below. All of the prior-art methods that will be described have the goal of securely providing a secret cryptographic key to both devices that is then used with suitable cryptographic means to perform authentication and encryption. These methods differ as to the manner in which the key is obtained. They also differ as to their policies regarding the reuse of keys or their precursor PIN codes.

A first typical method that the prior art allows for is for two devices to receive, through some unspecified external means, a secret key known only to them. This method might be appropriate for two devices that are manufactured to be permanently paired with each other. They can store this key in association with the partner device's identifier and reuse the key every time they wish to communicate. If no method is provided for changing the key, the two devices are permanently paired with one another and can never be paired with other devices that received a different permanent key at the time of manufacture. One drawback of such a policy of key reuse is that the security association between the two devices is permanent. Another drawback is that if a third party was somehow able to learn the key, it would be able to impersonate another device or eavesdrop on the two devices at will thereafter. In all these scenarios, the third party could even impersonate or eavesdrop unobserved, since radio frequency communications in the intended RF spectrum can penetrate sight-barriers such as buildings and walls.

A second method often described, slightly more secure than the first, might be appropriate for two devices that are to be exclusively paired with one another on a long-term basis, such as a personal computer and its wireless mouse, or a cellular telephone and its wireless telephone headset. This method requires both devices to be provided with the same string called a "PIN". The PIN may be provided by the manufacturer, or entered at each device by a user. The prior art defines how the PIN is combined with certain known, fixed data and certain ephemeral data to generate a secret key that is subsequently used for authentication and encryption. The precise details of how that occurs are not important here. Both devices wishing to create a long-term "pairing" relationship store the key associated with the paired device.

The PIN that was used to generate the key is no longer needed, and can either be kept or discarded. This stored key is then reused anytime the paired devices wish to communicate securely. If a device changes ownership, it is possible to delete the prior key, enter a PIN for a new pairing relationship, and create and store a new key. One drawback of this method is that if a third party somehow learns the PIN, such as by eavesdropping on a verbal exchange or keypad entry, it can learn the key by eavesdropping on the pairing flows. Once it knows the key, it can impersonate another device or eavesdrop on encrypted communications.

A third variation provided by the prior art might be appropriate for two devices that wish to trust each other only for the duration of a single transaction or data exchange. In this method, the user enters a PIN on both devices just prior to the transaction. The PIN is used, as above, to generate a key. The key is used for authentication and encryption for the transaction, but both the PIN and the key are deleted after the transaction. If the two devices wish to do another transaction sometime in the future, both must be configured with a PIN again, a process that is burdensome to the user.

In a less-secure variation of this third method, a device stores the PIN in association with an identifier for the partner device, but deletes the key after use. Thus it reuses the same PIN whenever communicating with the same partner, but generates a fresh key before each communications session. The third method improves upon the security of the second method by changing the key frequently, thus limiting the duration of time that a third party could violate security if it is successful in learning the PIN and eavesdropping during the pairing flows.

A fourth method known in the prior art is to request baseband authentication and encryption, but to generate a key for each new communications session using a zero-length PIN. This method might be chosen by a manufacturer who wants their product to work immediately upon removal from the shipping box, without any configuration by the user, and wants to provide a minimal level of security. The drawbacks of this approach are similar to those of the third method, in that any third party who knows that a zero-length PIN is in use could eavesdrop on the pairing flows and learn the secret key, enabling it to impersonate another device and/or eavesdrop on encrypted communications.

Clearly a method that obtains the key through a non-secure exchange has some potential for impersonation and eavesdropping. Current art suggests verbally telling another person the key or PIN number, or delivering it on a piece of paper or via e-mail, so that the secret may be entered on each device by that device's user. If this verbal, paper, or e-mail exchange is observed by a third party, the secret may be compromised. A slight improvement is to restrict knowledge of the key or PIN to a single person, who enters it on a keypad on both devices. This eliminates overhearing or seeing the key or PIN, but the keypad entry itself may be observed by a third party, such as by using a hidden camera. A method that generates a secret key for each communications session or transaction using a piece of data exchanged in an insecure manner is somewhat more secure, but still subject to impersonation and eavesdropping, should a malicious third party eavesdrop on the key generation and exchange process. In the event a third party somehow acquires the secret, clearly a policy of reusing the secret has a greater potential exposure than if the secret is never reused.

The above described prior-art security methods are inadequate, burdensome, and unusable for mobile computers in an enterprise environment. An example of such a scenario addressed by the present invention is shown in FIG. C.

In FIG. 3 there exists a server 301 that is connected to a typical enterprise LAN 303. A second server 311 is connected to the first server 301 over a WAN and also connected, conventionally to a LAN 321. Wireless devices such as a wireless notebook computer 315 can connect with a wireless access point on the server 311. The wireless device can also send information over the air waves to a printer 313 directly (rather than transmitting the information to the server 311 and having the server use a conventional wire line connection to transmit the information to the printer 313).

Another scenario depicted in FIG. 3 includes a wireless notebook computer 309, a telephone 307, and a pager 305. In this scenario, all three devices could communicate such that the telephone 307 or pager 305 could send messages to the notebook computer C19 for logging on the disk of the notebook computer 309. A realistic example of this in the business world might be where someone is in a meeting and awaiting the arrival of some urgent e-mail. The system could be set-up such that when new e-mail arrived at the notebook computer 309 (either over a cellular modem or over a LAN attached to the notebook computer via a piconet), the subject or sender of the e-mail would be sent from the notebook computer 309 to the pager 305 over the piconet and the pager would vibrate and display the message. Alternatively, the computer could dial the wireless telephone and, using a text-to-speech function, read aloud from an urgent e-mail. Another useful scenario might be where a facsimile machine 317 had a wireless connection to a notebook computer 319 such that the user of the notebook could utilize the underlying telephone network attached to the fax machine to send information to others without having to plug and unplug cables from the mobile computer, or access a server which has a connection to the printer. The connection would be made wirelessly directly between the notebook computer 319 and the facsimile machine 317. Yet another useful scenario is where a cable modem or ADSL adapter in the home is provided with a wireless transceiver, such that all type of devices in the home—such as personal computers, telephone handsets, television receivers, video recorders, audio speakers and audio recorders—can access the wire line network by means of a wireless connection. This offers a great convenience to users in that devices can easily be added or moved without the inconvenience and expense of cables or in-premises wiring. It is also desirable from the manufacturer or service provider's point of view, since it allows for the consolidation of multiple services in a single physical access device.

The problem that the prior art fails to address becomes extremely apparent when one considers an enterprise scenario. "Enterprise" as used here refers to a very large-scale computer installation or network, such as is typically deployed by very large companies or organizations with thousands to hundreds of thousands of employees. Due to their sheer size or because they are active in several geographical locations, enterprises often have numerous smaller sites and/or large campuses housing thousands of employees. Such sites and campuses are generally interconnected by networking facilities such that an employee traveling from one site to another can gain access to application programs, resources, databases, and other computer facilities needed to do their job at any company location. In an enterprise scenario thousands to hundreds-of-thousands of users will roam among several to thousands of sites carrying wireless devices, each wishing to connect wirelessly in an unplanned ad-hoc manner to several devices throughout a given day. "Roam" as used here refers to a user physically moving himself and his mobile device containing a radio module from one location to another.

Because of the personal computer's multi functional character (i.e. a PC usually runs many different programs that exchange data with many different applications and devices on behalf of many different users), a personal computer user's security needs run the gamut from completely untrusted to totally trusted, which further complicates matters. The previously described state-of-the-art technology provides several ways to implement security policies, but none is satisfactory for this enterprise context. Let us examine whether any of the previously-described art can be used by a network administrator to limit access to a network.

1. Devices could be permanently paired with one another by the manufacturer, but this is inflexible and prevents a device from having multiple communication partners.
2. Devices could have long-term pairing relationships with specific other devices, for example by entering a common PIN at both devices, from which a key could be created for storage and reuse, or a fresh key generated for each communication session. Besides the drawbacks previously listed, this policy does not meet the needs of a PC to have different levels of security for different communication partners and, indeed, for different transactions with the same partner.
3. The administrator could configure all network access points with the same PIN, then provide the PIN to all possible mobile computer users that are allowed access. This minimizes the administrator's configuration effort since there is only one PIN to set up (albeit at multiple access points), and allows a properly-configured PC to roam anywhere in the enterprise and gain access through any access point, but if the secret PIN is compromised, the malicious third party could gain access to all access points. If an authorized employee quits the company, there is no easy way to revoke his access. This scheme is unacceptable because it is so insecure.
4. The administrator could configure each network access point or group of access points with a different PIN, then provide the PINs of certain access points to certain sets of authorized users. If an unauthorized person learns a PIN, he gains access to a set of access points. Managing lists of PINs at numerous mobile computers becomes difficult. Revoking a user's access privileges is difficult if the user retains the access device. The administrator could change the access points' PIN to bar an unauthorized user, but this forces all authorized users to simultaneously update their configurations. If the administrator wants to add a new network access point with a new PIN, all authorized users must be notified and must update their PCS. Giving a user access to different groups of access points, e.g. during travel, is difficult. Clearly this scheme is unworkable.
5. The administrator could assign a unique PIN to each mobile PC, and configure lists of authorized PINs at specific access points. Management is even more difficult. If the lists include all users, they may become unmanageably long, and also add to the cost of the access point devices since additional memory must be provided to store a large number of PINs. If the lists contain subsets of users, then a user's ability to roam is limited. If a user is added or removed, the administrator has to update information at all relevant access points. This method is relatively secure, except that if a person gains knowledge of the access lists configured at any access point, he could gain access to multiple access points by impersonating another device or misappropriating another user's PIN.

As is apparent from the foregoing, short-range wireless mobility presents a significant security challenge to enterprise network administrators. This is addressed by the present invention.

SUMMARY OF THE INVENTION

The present invention allows the use of wireless devices containing a radio module to connect in a secure manner using digital certificates. The present invention does not require manual entry of user identifiers, passwords, or cryptographic keys. The present invention also allows for efficient administration of secure devices within an enterprise without creating additional administrative overhead for initializing the devices. It describes a method, apparatus and program product for authentication, securely generating and exchanging an ephemeral cryptographic key for encryption, and a means of performing and administering discrete access control in an enterprise, while eliminating the inflexibility of pre-configured secrets, and while reducing the security exposures associated with the manual entry, storage, and/or reuse of secrets.

OBJECTS OF THE INVENTION

It is an object of the present invention to provide a method for efficient initialization of mobile, wireless devices having an embedded radio module.

It is yet another object of the present invention to utilize known public key technology in a new and unique manner to accomplish the initialization of the mobile devices.

It is yet another object of the present invention to use secure storage in a distributed enterprise device to provide a secure method of wireless authentication and communication.

This and other objects will be described in furhter detail with respect to the figures and a preferred embodiment presented below.

DETAILED DESCRIPTION OF THE PREFERRED EMBODIMENT

The preferred embodiment of the present invention is presented to provide sufficient enabling information such that the reader may implement the present invention. It is not meant to limit or restrict the invention in any way.

The designers of the Bluetooth specification have not prohibited performing authentication and encryption at the baseband (or physical) layer, but current methods for initializing such authentication and encryption have unacceptable characteristics for mobile computers especially in an enterprise context. There is, as yet, significant confusion as to how to implement security (i.e., authentication, encryption, access control, and the administration of the same) efficiently in an enterprise. The present methodology of defining who can interact with whom and which 'shared secrets' (such as PIN numbers, cryptographic keys, etc.) will be used to secure the connections between specific devices, users, applications and groups does not yet exist.

In enterprise situations, which the majority of the specification is targeted towards, the problem of security becomes enormous. Each application as well as each device may require a different level of security, requiring the ability to allow different levels of security accesses. None of the contemplated solutions such as the extremes of entering a PIN before each transaction and never storing the PIN or cryptographic key, or using the same stored PIN or cryptographic key repeatedly for all transactions, is acceptable. A midpoint security option of generating ephemeral new cryptographic keys on the fly from a stored PIN is unacceptable also since anyone who knows the PIN can potentially learn the new link key by eavesdropping on the pairing flows.

The present invention solves this and other problems of securely communicating in a wireless environment, as well as potentially other environments. The present invention is no way limited to the present implementation. It is equally applicable to any mobile environment where devices are frequently accessing other devices and require a secure form of identification or authentication, a method to securely generate and exchange cryptographic keys which can be used for encryption and other purposes, and a method of discrete (i.e. per device, per user, per group, per application, or per transaction) access control, including the ability to add, revoke or change access privileges.

Figure 4:
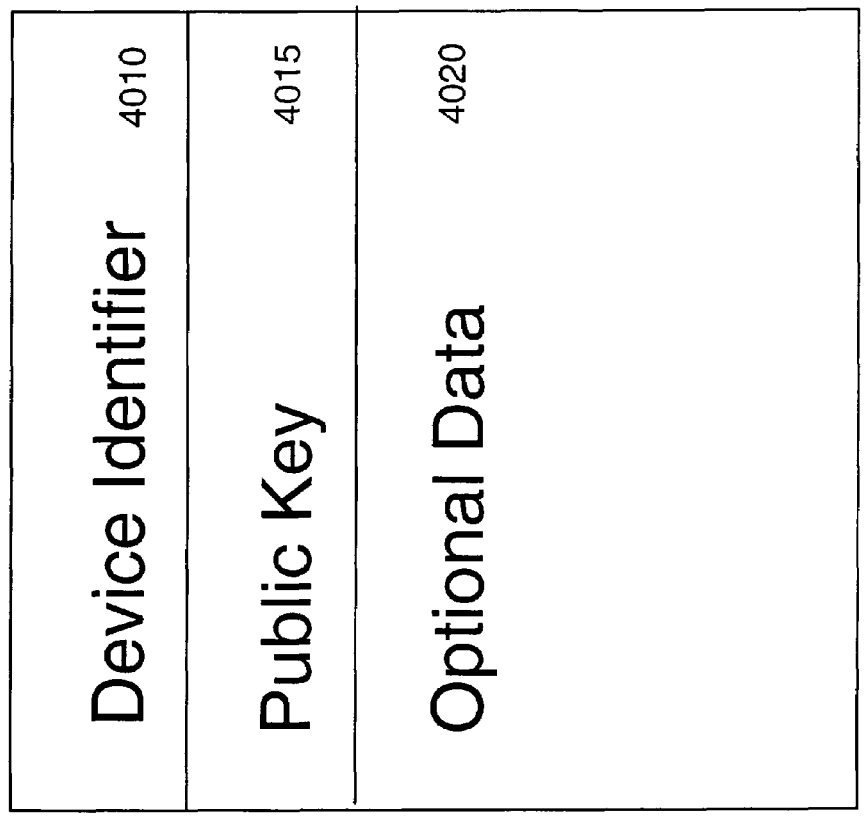
FIG. 4 is an exemplary device certificate layout.

The preferred embodiment of the present invention involves a combination of certificates associated with users and devices. Certificates, as shown in FIG. 4, generally contain at least a device identifier 4010, a device's public key 4015, and an area for optional data 4020. In addition the preferred embodiment of the present invention involves a centrally administered access control database.

In the prior art, certificates have been associated with users or high-level application programs, not with devices. Hence, a user could take a certificate with its corresponding private key from workstation to workstation on something such as a smart card and the certificate identified the user (the private key being the proxy of the user who controlled its use). The verification and validation of the certificate was done through TCP/IP flows between the communicating devices. The present invention tightly couples the certificate with the device, or more specifically with the radio module contained in the device, whose unique identifier is used as the certificate's unique identifier.

The preferred embodiment of the present invention assigns a certificate to each device containing the proposed radio module. The exemplary certificate described contains the device's unique 48-bit IEEE (MAC) address (although any unique identifier could be used equally effectively), the device's public key, a validity period, and a signature from a Certificate Authority. In the preferred embodiment of the present invention, the device identifier is stored in the certificate's "subject" field. Each device also has associated with it (a public key, private key) pair, said public key being the same public key stored in the above-mentioned certificate. The device must also acquire the root Certificate Authority's public key or the public key of a Certificate Authority in the certificate authorization chain (herein after referred to as the CA's public key) so that it can verify the authenticity of certificates received from other devices. The signature of the Certificate Authority indicates that the association between device identifier and the public key in the device certificate can be trusted if the Certificate Authority is known and trusted. The public key of the Certificate Authority is used to verify its signature of other device certificates.

As is well known in the field of public-key cryptography, a public key can decrypt data encrypted by the corresponding private key. Additionally a private key can decrypt data encrypted by the corresponding public key. It is also well known that a block of data may be signed by computing a hash over the block and then encrypting the hash with the private key of the signer. The signature can be tested by decrypting the signature with the public key of the signer and comparing the result to a just-computed hash of the data block. If these values match, it shows that the signer had the private key corresponding to the public key and also that the data block has not changed.

In the preferred embodiment of the present invention, the device's private key is stored in that device in a way that physically protects the private key value but allows device-resident software to ask the hardware to perform a digital signature operation using the private key value. One way to accomplish this is by using a write-only storage means, such that there is there is no way for software residing in the device to read the key but the device can execute operations against the information. An example of an operation on a protected value is a digital signature operation using the private key value. Although this embodiment is preferred, any other means of protecting the information is equally applicable. For example, an alternative location for such physically secure storage is a smartcard or smartcard chip. The storage in current smartcard devices allows read access to the data only if the correct PIN or password is entered. This is still significantly better than the prior art since the prior art requires a password or PIN to be entered for each device to be accessed whereas the smartcard implementation of the present invention only requires a single password or PIN to be entered once during device initialization, and the certificate is used for further secure transactions.

First a method is provided to initialize devices distributed with an embedded radio module which are delivered to a central point, such as an enterprise, prior to distribution to end users. Traditionally, before placing a new computing or communications device into service at an enterprise, a person performs an administrative procedure of configuring the device to permit it access to specific enterprise resources such as a network, a database, a server, and so forth. This is accomplished by entering some secret information such as a string of numbers forming a PIN or password. This is extremely error prone and tedious, time consuming work. Utilizing the present invention, an administrator for an enterprise device (containing a radio module) utilizes a server having a radio capable of communicating with the radio on the enterprise device. The server executes an inquiry to the enterprise device when it is within acceptable proximity. The enterprise device returns its unique device identifier, preferably a 48 bit IEEE (MAC) address. Under secure conditions the server then creates a public/private key pair and associated certificate for the enterprise device and securely transmits these data items to the device for which they were created. The enterprise device stores the certificate (in any type of storage) and its private key (in the previously-described protected storage). A copy of the certificate is n placed in an enterprise database. FIG. 1 depicts the information flows in further detail.

For additional security for high-function devices, the above flow is modified so that the device generates the public/private key pair and transmits only the public key to the administration server. In this way the private key is born and dies on the device without ever being transmitted. For even greater security, the special memory (protected storage) on the device could be augmented to perform this key-pair generation, such that the private key would never be available even to the software on the device.

Figure 1A:
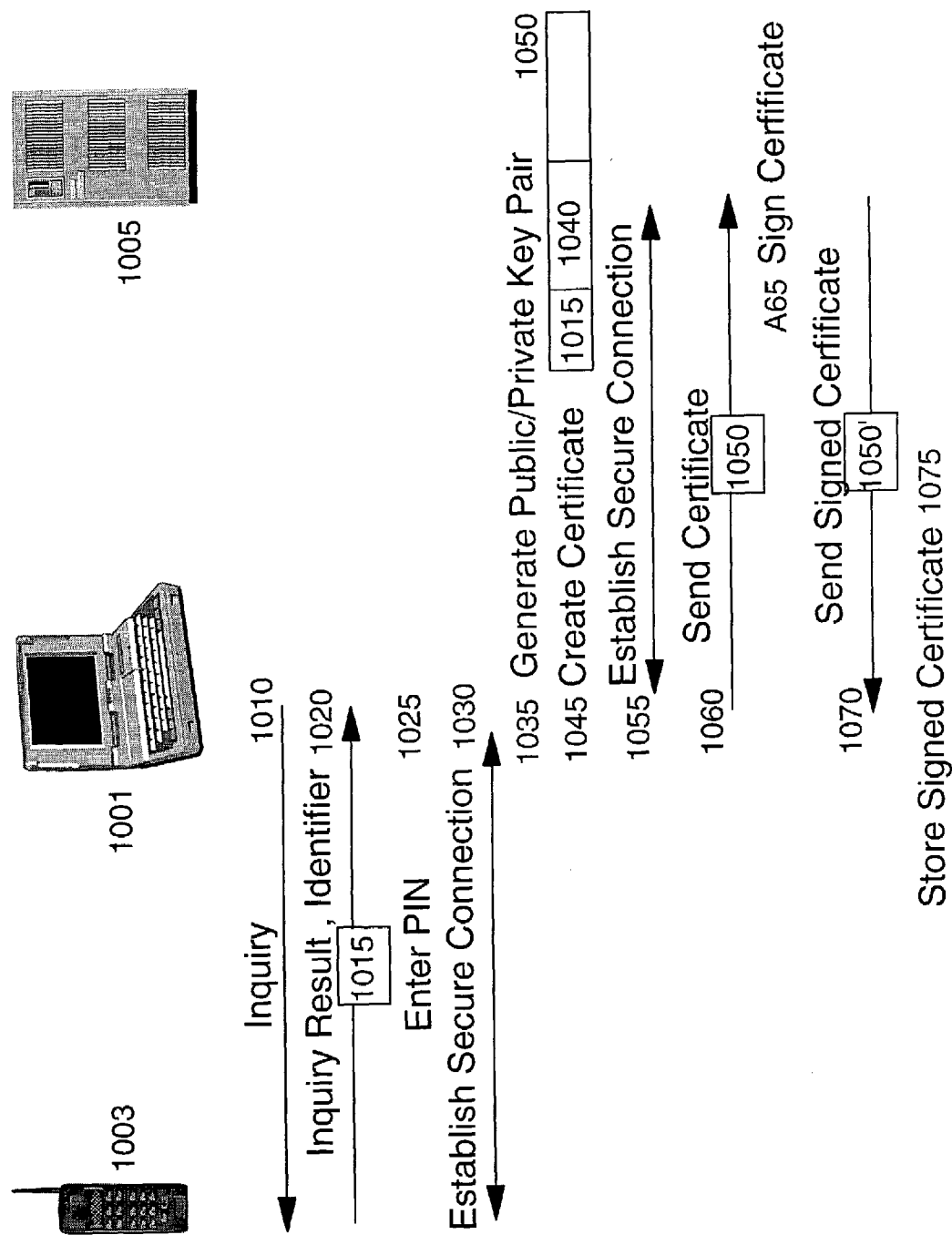
FIGS. 1A and 1B depict typical setup flows between a mobile device with imbedded radio module and an administration server.
Figure 1B:
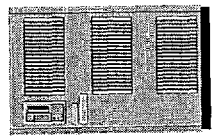
Figure 1B:
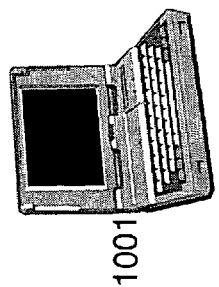
Figure 1B:

In FIG. 1A, first the administration server or initializing device 1001 sends an inquiry 1010 to the new mobile device 1003 requesting mobile device 1003's unique identifier. The mobile device 1003 transmits 1020 its unique identifier 1015 to the administration server 1001. The administrator at the administration server 1001 then verifies that the unique identifier transmitted by the mobile device is the same as that received regarding that device by another means (such as printed on the device, sent with the documentation concerning the device, etc.). A connection is then established between the devices 1001 and 1003. The administrator enters a PIN or encryption key 1025 on one or both of the administration server 1001 and the mobile device 1003 such that a temporary secure link can be established for the purpose of device initialization, using prior-art flows 1030. As a result, a secure connection between 1003 and 1001 is established at 1030. The administration server 1001 then acquires or generates a public/private key pair 1035 for mobile device 1003. At 1045 the administration server 1001 puts the created public key 1040 into a certificate request message buffer 1050 along with device 1003's unique identifier 1015 acquired during the previous flows. At 1055 the administration server 1001 establishes a secure connection to a Certificate Authority 1005 and sends 1060 the certificate request 1050 that was prepared for mobile device 1003 to the Certificate authority whereupon the Certificate Authority 1005 signs 1065 and returns 1070 the certificate signed with the Certificate Authority's private key. When the administration server 1001 receives the signed certificate 1050', it stores the certificate 1050' at step 1075 and sends the signed certificate 1050' and the corresponding private key (if the administration server generated the public/privae key pair) to the mobile device 1003 over the secure connection 1080 and sends the Certificate Authority's certificate (containing the CA's public key) to mobile device 1003 as well, and the session is ended. The signed device certificate and its associated private key are stored 1085 in the mobile device 1003 for future use, the device private key being stored in protected storage 1090 along with the CA's public key (used to verify signatures in other device certificates) and the device certificate being stored in any suitable location. In the preferred embodiment, a copy of the device certificate is also stored in an enterprise access control database for future reference. The PIN is deleted 1095 as is the shared secret for securing the connection between the adminisration server 1001 and the mobile device 1003.

Figure 1C:
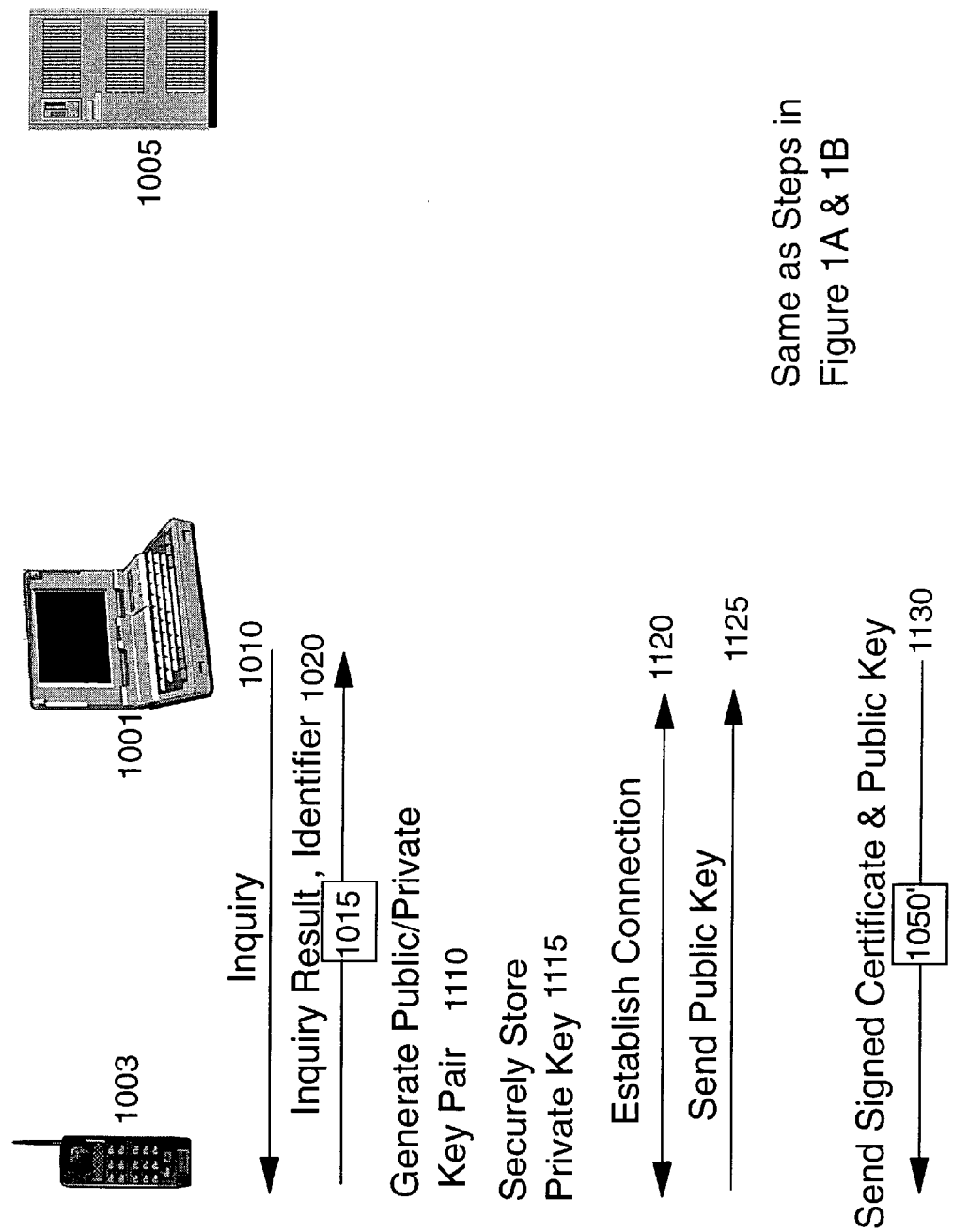
FIG. 1C depicts initialization flows for mobile devices with sufficient computing power to generate their own public/private key pairs.

As pointed out above, a slight modification of the flows is preferred if the enterprise device possesses adequate computing power to create its own public/private key pair as shown in FIG. 1C. Instead of the administration server generating the public/private key pair, the device 1003 generates the public/private key pair itself 1110 and immediately stores its private key in protected storage 1115. In this case 1003's private key is never transmitted to anyone.

Device 1003 establishes a secure or non-secure connection 1120 with the administration server and transmits 1125 only its public key to the adminstration server 1001. The administration server 1001 still performs the same steps of putting the public key and device identifier into a certificate request, securely transmitting the data to the Certificate Authority (CA) 1005 so that the CA can generate a digitally signed certificate 1050' using its private key and transmit the signed certificate back to the administration server 1001, and transmitting the signed certificate to the device 1003 over a secure or insecure connection for storage there in any suitable memory location as described in FIGS. 1A and 1B. In this form of the invention, the device 1003 must also acquire the CA's public key 1130, and store it in the manner previously described.

Once a public key, private key and certificate have been created, the administrator can use standard distribution techniques such as those available with IBM's On-Demand Server to associate the device with a particular user or group of users, the user or user group or device with access control groups and to log device characteristics of the device.

Yet another variation on the above embodiment is to include additional data in extension fields within the signed certificate. Such additional fields could include, for example, user group associations, access control groups, etc. which then could be used in isolated pairing situations to allow autonomous access policy decisions to be made.

During operation when a wireless connection using the present invention is first established between a pair of devices that have been provided with device certificates, authentication and encryption may initially be turned off. The devices establish a "pairing" relation with one another using a protocol similar to the control records which flow in SSL/TLS in the clear, through and including the step where a symmetric Key Agreement is reached. While SSL/TLS provides several options that can result in a Key Agreement, any of which are suitable for use by the present invention, the preferred embodiment is the Diffie-Hellman key agreement. The SSL/TLS control records protocol causes the devices to exchange certificates with each other, resulting in mutual authentication, without the entry or storage of a PIN or cryptographic key on either device and without having to ever reuse cryptographic keys or PINs. The session key generated by performing an SHA-1 function on the SSL key material taken from the SSL/TLS control records protocol and then taking a subset of n bytes as required, is then passed by each of the pairing devices to its local encryption component (such as its baseband firmware in the preferred embodiment), to be used as the link key for the duration of a communications session with the partner with whom the Key Agreement has been reached or for the duration of the Key Agreement, whichever is less, or for whatever period of time is suitable for the requirements of the application, the user, the device and the enterprise. Encryption for that partner using the generated key is then activated. Should the Key Agreement expire while the session is still in progress, the paired devices can use the same SSL/TLS control records protocol, either encrypted using the prior session key of in the clear, to establish another Key Agreement resulting in a new session key that is again passed to their respective encryption component, as previously described. Although SSL/TLS is chosen for the preferred embodiment because it is regarded as extremely thoroughly tested and secure, any methodology using certificate exchange and private keys to generate sessions could be used. Another suitable prior-art method is described by the IP Security Protocol (IPSec) working group of the IETF in a series of RFCs (Request for Comments). Refer to RFC 2411 "IP Security Document Roadmap" for further background information.

Figure 2:
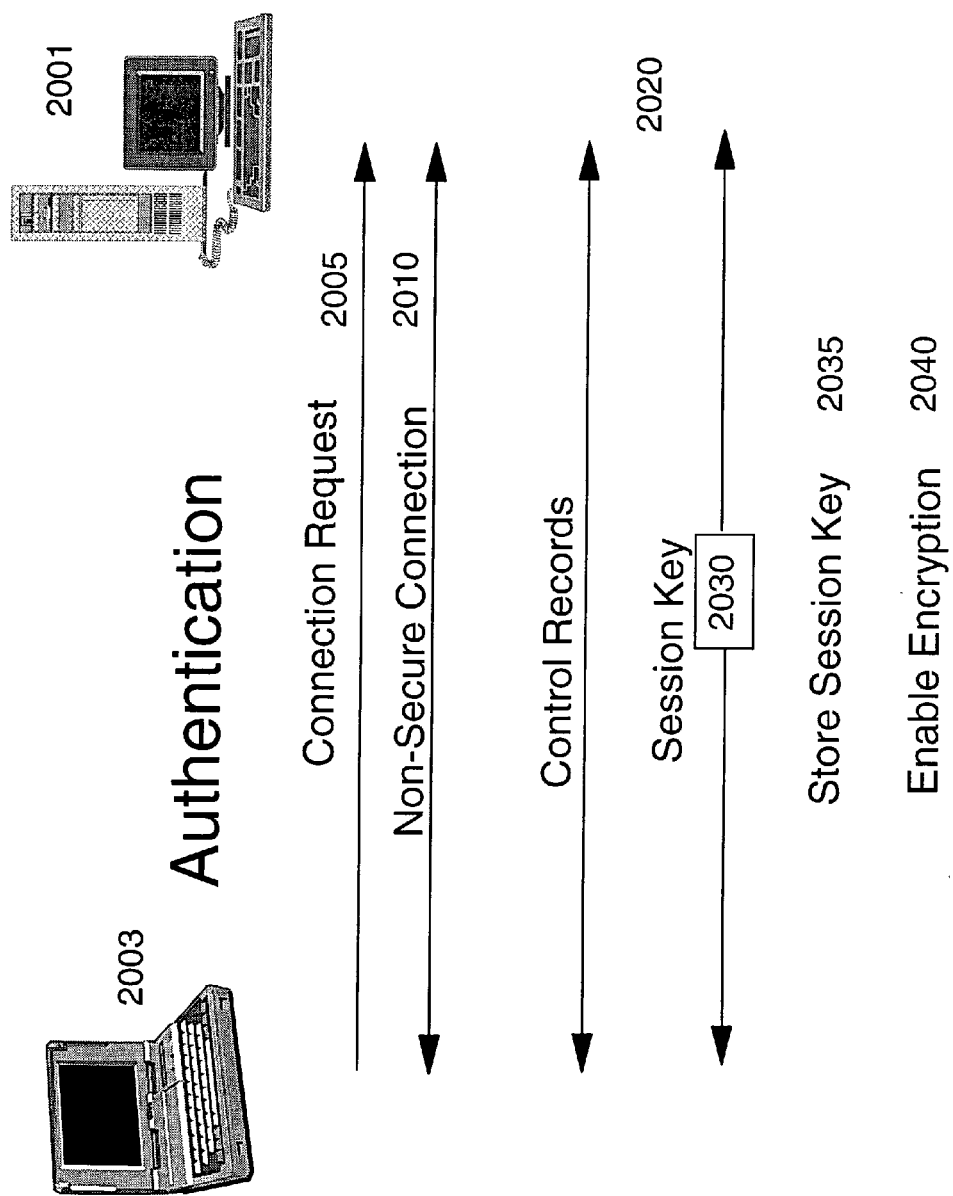
FIG. 2 depicts a possible authentication flow in the preferred embodiment of the present invention.
Figure 3:
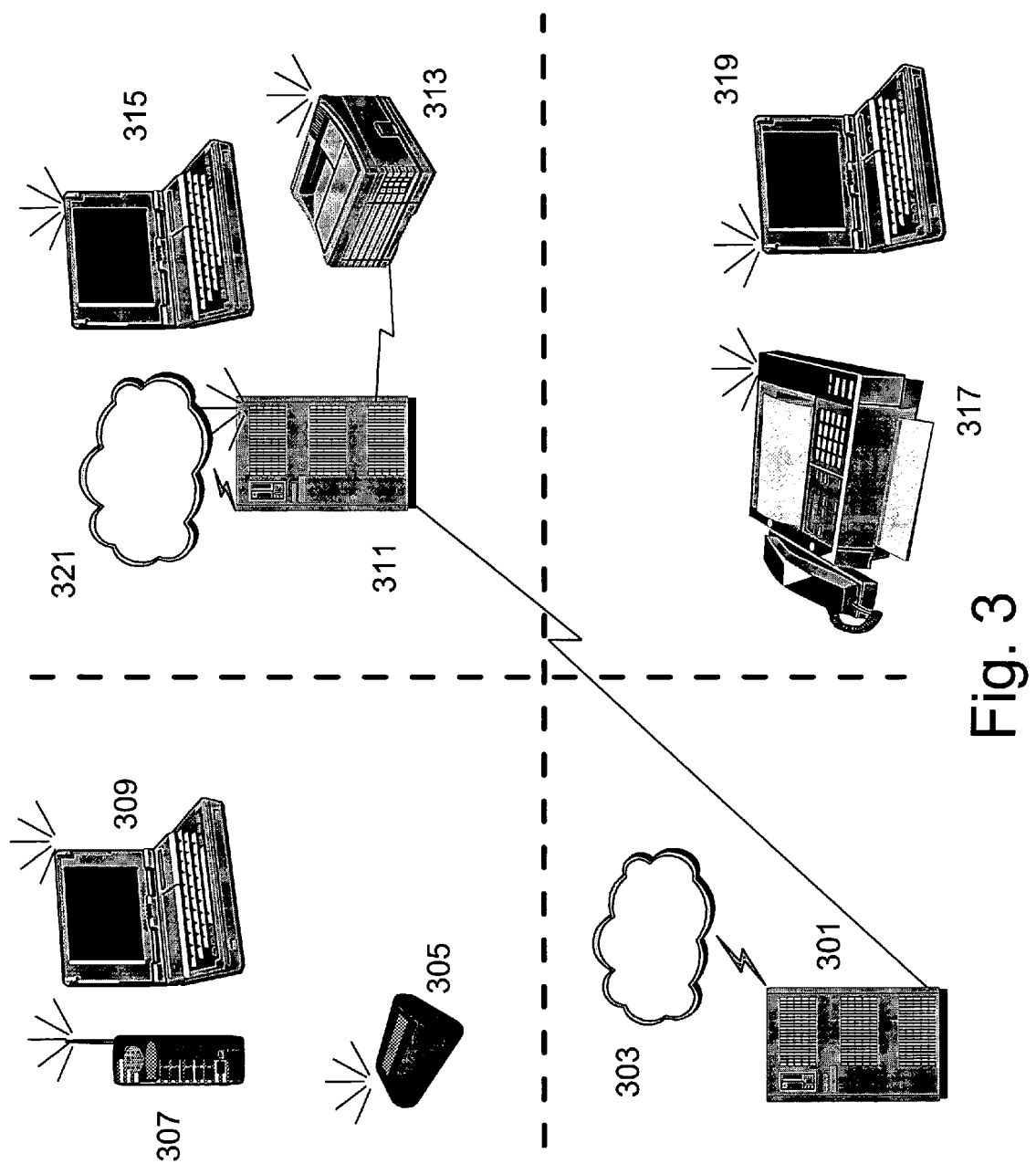
FIG. 3 is a subset of a sample network in which the present invention may be implemented.

FIG. 2 depicts example flows for establishing secure communications between multiple devices each equipped with a radio transceiver using the present invention. In the preferred embodiment, the FIG. 2 flows occur sometime after each device has been provided with its own Device Certificate, its own private key, and the Certificate Authority's well-known public key, as previously described with respect to FIG. 1. However, the present invention does not exclude providing the data items in some other way. When a first device, say a notebook computer 2003 desires to communicate with a second device 2001, the first device 2003 sends a connection request 2005 to the second device 2001. A non-secure connection 2010 is then established between the first and second devices. Alternatively, 2010 may be an authenticated and/or encrypted connection using a default PIN, such as a zero-length PIN. As the control flows of SSL/TLS protocol progress in our preferred embodiment the following functions are performed; if another flow is used in place of this control flow then it must provide the same functions. A negotiation takes place that agrees on the need for and type of authentication, the need for encryption, the details of the cryptographic algorithms, and the details of compression if any 2020. For this use authentication is two way (both first speaker and second speaker will know each other's identity), encryption is demanded and the algorithm is that used by the baseband hardware/firmware or other encryption component present in the pairing devices, and finally compression is specified as NULL. As authentication proceeds, the special memory (protected storage) is asked to sign with the local device's private key (protected value) to prove said device's identity to the second device, and the special memory is asked to verify the CA's signature to validate the second device's certificate, so that the public key contained in said certificate can be trusted to verify the second device's signature. If at any point the authentication of the partner fails, the session is terminated. As a consequence of asking for encryption, a session key is agreed upon 2030 in a secure fashion and at this point the SSL/TLS protocol or equivalent is terminated with the agreed-upon session key 2035 used to initialize the baseband transport (or other suitable local encryption component) to enable encrypted operation thereafter 2040.

The above-described authentication flow resulted in the exchange and validation of both devices' certificates. This means that the optional extension fields of these certificates are available for policy decisions. For example, the second device 2001, based on the contents of the verified certificate of the first device 2003, can consult a local or enterprise access control database using the required device identifier or optional (associated individual or group names) certificate fields to decide what resources/functions may be exercised via the encrypted connection by 2003. All of this is accomplished securely by negotiation directly between the devices, and does not require entry or storage of secrets associated with each potential communication partner, such as user identifiers and passwords, PINs, or encryption keys, on the part of the user or administrator, other than the one-time initialization procedure of FIG. 1 or some equivalent procedure that provides each device with a Device Certificate, private key, and Certificate Authority's public key as previously described.

In the preferred embodiment, since devices are registered in an access control database at a server, the certificates provide a method of controlling access to services and resources, as well as selecting preferences which should be enabled for the device, such as formatting a data stream for a specific type of display or enabling access to specific data records. If a mobile device utilizing the method of authentication described in the present invention is lost by its assigned user, the device's certificate may be revoked (just as a credit card issuer revokes a stolen credit card today). Certificate revocation at an enterprise central location such as a directory or database is effective only if authentication protocols at other devices require interaction with the directory or database. In a disconnected mode where authentication does not require access to a central directory or database, the most effective method of revocation and denial of access is to have the device certificate expire and require the user of the device to periodically renew the device certificate. A validity period field is provided in the certificate for this purpose, as previously mentioned. FIG. 5 depicts this in further detail.

Figure 5A:
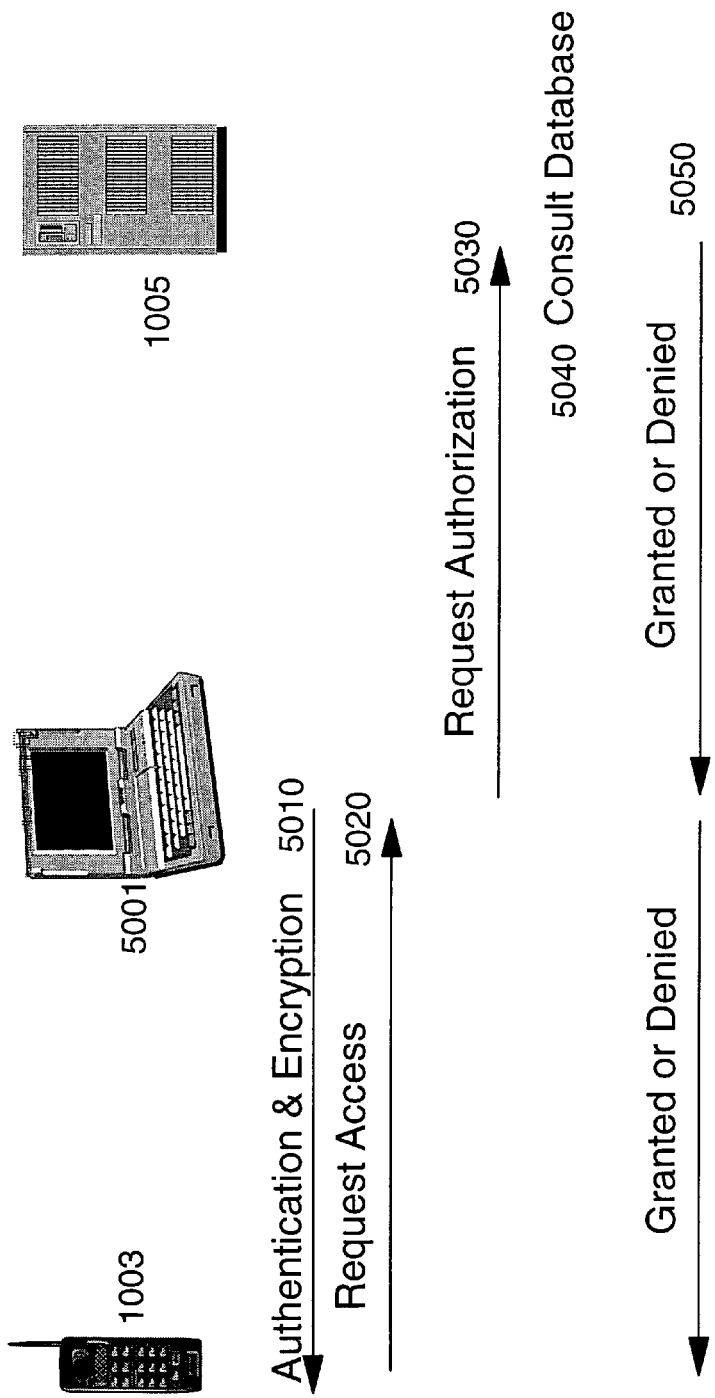
FIG. 5A depicts the flows for centralized access control.

FIG. 5A demonstrates central access control where a mobile device 1003 requests access to a first resource 5001. The mobile device 1003 and the first resource 5001 perform mutual authentication and negotiate encryption 5010. The mobile device 1003 then requests access to one or more resources 5020. The first resource 5001 sends a request for authorization 5030 for the mobile device 1003 to the central directory or database 1005. Access is either granted or denied based on the information in the central database or directory 5050.

Figure 5B:
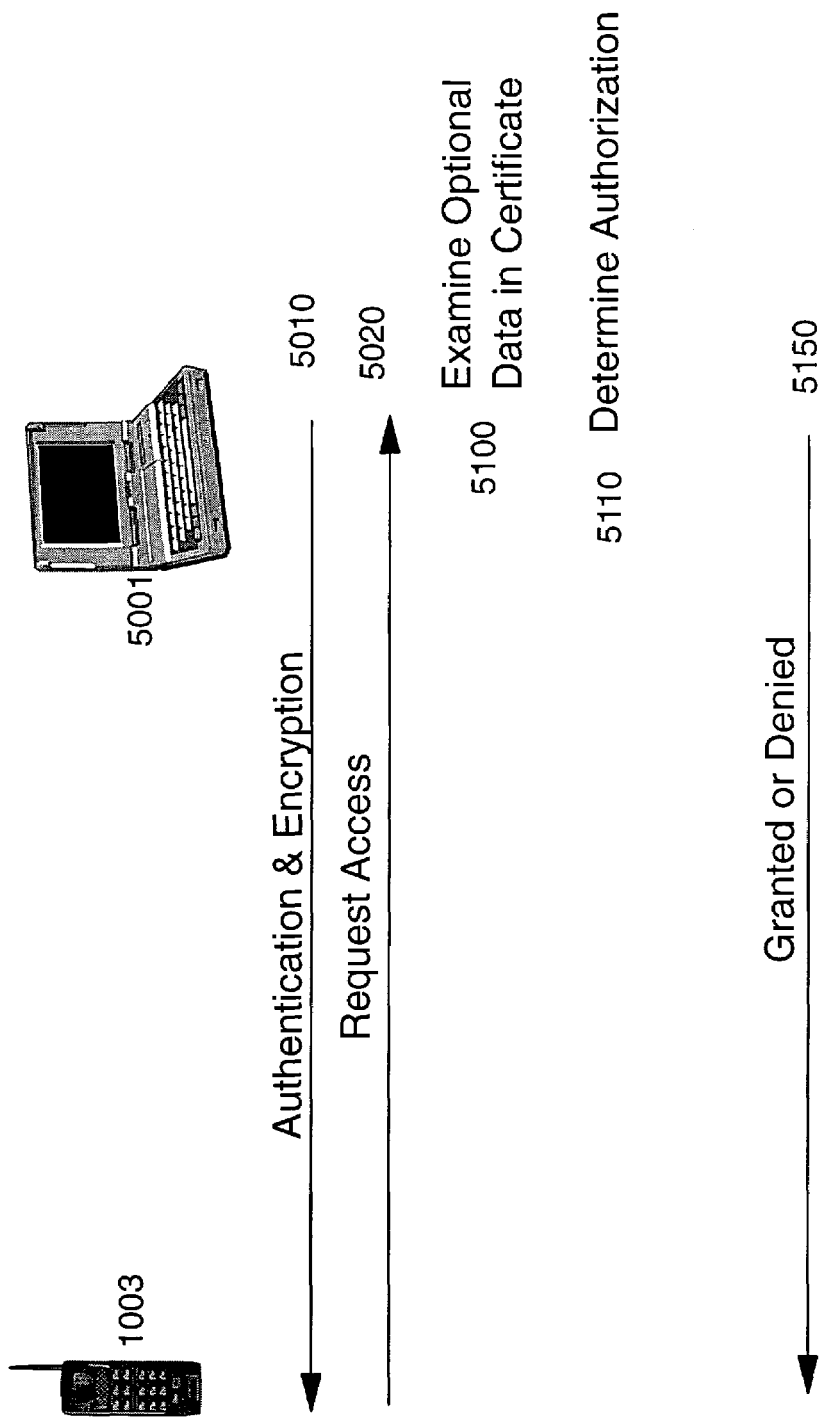
FIG. 5B depicts the flows for access control using a disconnected mode.

FIG. 5B demonstrates disconnected-mode access control where the two devices, 1003 and 5001, mutually authenticate and negotiate encryption 5010, the mobile device 1003 requests access to a resource 5020, but in the disconnected scenario, the receiving resource 5001 examines the optional data in the decrypted certificate 5100. Upon examining the data, the first resource 5001 makes a decison as to whether to allow access based on the fields of the certificate and locally stored information 5110. The fields of the certificate may contain information such as expiration dates for the certificate. Access to the requested information is granted or denied 5150 as before, but based on this locally obtained information.

Using the present invention, a first device is authenticated if the following three statements are true: (1) its certificate chain can be validated by checking the respective contained signatures back to the point where one finds a trusted CA signer (as represented by the CA public key saved in FIG. 1B), (2) it can be demonstrated that it possesses the private key associated with the public key contained in its certificate and (3) the device identifier stored in the certificate matches the device's actual device identifier, which can be ascertained by other means such as visually or from standard communication flows. In the preferred embodiment, a first device proves that it possesses the matching private key by a signature of a challenge within the control record flow of SSL/TLS or equivalent protocol. An imposter could steal the first device's certificate from unprotected sotrage and eavesdrop to learn the first device's MAC (machine) address. The imposter could then attempt to impersonate the first device by spoofing the unique identifier (MAC address) and replaying its certificate but the imposter has no way of getting the first device's private key which is kept secret in protected storage and hence is unable to sign the challenge.

Figure 6:
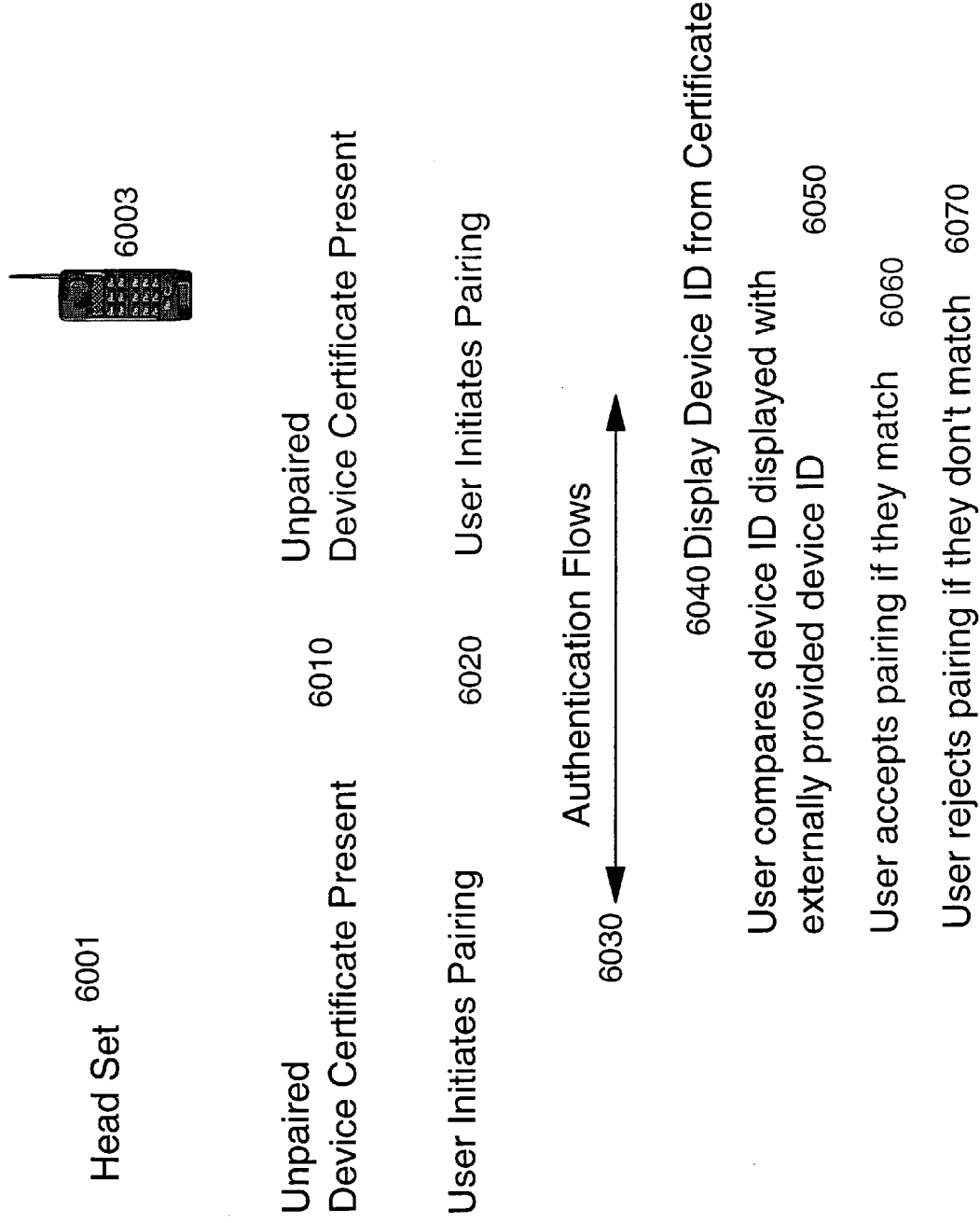
FIG. 6 depicts the pairing of consumer devices using device certificates.

Other examples where the present invention might be useful include the creation of long-term secure pairing relationships between devices without the entry of PINs or encryption keys, such as associating a device such as a headset with a mobile telephone as is shown in FIG. 6. This could be accomplished as follows. A user has two devices (6001 and 6003) between which he or she wishes to establish a secure relationship. Each device is provided with a device certificate as previously described containing its device identifier or serial number, which is also visible externally or known through some external means. Instead of the device certificate, matching private key, and Certificate Authority's public key being generated by an administrator, these data items could be preinstalled by the manufacturer 6010. The device is then shipped by the manufacturer in an uninitialized (unpaired) state, i.e. with no link keys, PINs, or pairing relationships defined. Bringing the two unpaired devices into radio proximity, the user pushes a button 6020 which executes a special function when the device is unpaired. It causes the device to transmit its certificate 6030 to the other device as was described with respect to FIG. 2. At least one of the two devices needs to have a display device (not to exclude devices that use audible or other output means) that can display the identifier of the pairing device 6040. The device with the display verifies the other's certificate by checking the certificate chain authenticity using the Certificate Authority's public key. If the device identifier in the certificate matches the device identifier written on the outside of the device or known through other external means, it is authentic 6050. The user then pushes a button 6060 (not to exclude other means of making a selection) and the device accepts the pairing relationship and the device identifier (or optionally the link keys) are set into permanent or long-term storage (flash RAM or similar storage representing a local access control database). If the certificate does not match the device identifier the user rejects the pairing and the operation is terminated 6070. Now the two devices are paired and can securely reauthenticate (using certificates or optionally the link keys as a shared secret) and establish encrypted communications at any time in the future. This enables manufacturers to uniquely pair devices without having to synchronize the manufacturing of the devices throughout the production process. If the owner of a paired device choses to transfer ownership of that device to another person, the owner can delete the pairing relationship and the future owner can establish new pairing relationships for the device by performing the same steps previously described.

This method of device certificate based initialization is especially well suited for consumer devices that will have long-term exclusive pairings such as a cordless telephone handset and a telephone base station, a personal computer and a wireless audio headset, a personal computer and a wireless mouse, etc.

What is claimed is:

1. A method for initializing a first device distributed with an embedded radio module using a server, said server having an embedded radio module, said method comprising the steps of:

sending an inquiry from said server to said first device using said embedded radio modules;

returning, from said first device, a unique device identifier of said first device, to said server;

creating, at said server, a public key, private key pair for said first device;

creating, at said server, a device certificate for said first device, said device certificate having a unique hardware identifier associated with said first device and a public key associated with said first device;

transmitting said private key, and said device certificate, and a public key of a Certificate Authority which signed said device certificate, to said first device; and storing said private key in non-removable protected storage at said first device;

wherein said protected storage is write-only storage able to perform computations involving previously-written data.

2. A method as claimed in claim 1 wherein a copy of said certificate is stored in an enterprise database.

3. A method for initializing a first device distributed with an embedded radio module using a server, said server having an embedded radio module, said method comprising the steps of:

sending an inquiry from said server to said first device using said embedded radio modules;

returning, from said first device, a unique device identifier of said first device, to said server;

creating, at said server, a public key private key pair for said first device;

creating, at said server, a device certificate for said first device, said device certificate having a unique hardware identifier associated with said first device and a public key associated with said first device;

transmitting said private key, and said device certificate, and a public key of a Certificate Authority which signed said device certificate, to said first device; and storing said private key in non-removable protected storage at said first device;

wherein said protected storage is write-only storage able to perform computations involving previously-written data;

wherein a copy of said certificate is stored in an LDAP directory.

4. A method for initializing a first device distributed with an embedded radio module using a server, said server having an embedded radio module, said method comprising the steps of:

sending an inquiry from said server to said first device using said embedded radio modules;

creating, at said first device, a public key, private key pair for said first device;

storing, at said first device, said private key in non-removable protected storage;

returning, from said first device, a unique device identifier and said public key of said first device, to said server;

creating, at said server, a device certificate for said first device, said device certificate having said device identifier and said public key; and transmitting said device certificate and a public key of a Certificate Authority which signed said device certificate to said first device;

wherein said protected storage is a write-only storage able to perform computations involving previously-written data.

5. A system for initializing a first device distributed with an embedded radio module using a server, said server having an embedded radio module, said system comprising:

a communications mechanism for sending an inquiry from said server to said first device using said embedded radio modules, and returning, from said first device, a unique device identifier of said first device, to said server;

a processor at said server for creating a public key, private key pair for said first device; and a device certificate, created at said server, for said first device, said device certificate having a unique hardware identifier associated with said first device and a public key associated with said first device;

wherein said communications mechanism transmits said private key, and said device certificate, and a public key of a Certificate Authority which signed said device certificate, to said first device; and, said processor stores said private key in non-removable protected storage at said first device;

wherein said protected storage is write-only storage able to perform computations involving previously-written data.

6. A system as claimed in claim 5 wherein a copy of said certificate is stored in an enterprise database.

7. A system for initializing a first device distributed with an embedded radio module using a server, said server having an embedded radio module, said system comprising:

a communications mechanism for sending an inquiry from said server to said first device using said embedded radio modules, and returning, from said first device, a unique device identifier of said first device, to said server;

a processor at said server for creating a public key, private key pair for said first device; and a device certificate, created at said server, for said first device, said device certificate having a unique hardware identifier associated with said first device and a public key associated with said first device;

wherein said communications mechanism transmits said private key and said device certificate, and a public key of a Certificate Authority which signed said device certificate, to said first device; and, said processor stores said private key in non-removable protected storage at said first device;

wherein said protected storage is write-only storage able to perform computations involving previously-written data;

wherein a copy of said certificate is stored in an LDAP directory.

8. An initialization system, said system comprising:

a first device, said first device having an embedded radio module;

a server, said server having an embedded radio module;

a communications mechanism, said communications mechanism sending an inquiry from said server to said first device using said embedded radio modules;

wherein said first device creates a public key, private key pair for said first device, stores said private key in non-removable protected storage, and returns a unique device identifier and said public key of said first device, to said server;

said server creates a device certificate for said first device, said device certificate having said device identifier and said public key; and transmits said device certificate and a public key of a Certificate Authority which signed said device certificate to said first device;

wherein said protected storage is a write-only storage able to perform computations involving previously-written data.

9. A computer program product embodied in a machine readable medium for initializing a first device distributed with an embedded radio module using a server, said server having an embedded radio module, wherein said computer program product comprises the programming steps of:

sending an inquiry from said server to said first device using said embedded radio modules;

returning, from said first device, a unique device identifier of said first device, to said server;

creating, at said server, a public key, private key pair for said first device;

creating, at said server, a device certificate for said first device, said device certificate having a unique hardware identifier associated with said first device and a public key associated with said first device;

transmitting said private key, and said device certificate, and a public key of a Certificate Authority which signed said device certificate, to said first device; and storing said private key in non-removable protected storage at said first device;

wherein said protected storage is write-only storage able to perform computations involving previously-written data.

10. The computer program product as claimed in claim 9 wherein a copy of said certificate is stored in an enterprise database.

11. A computer program product embodied in a machine readable medium for initializing a first device distributed with an embedded radio module using a server, said server having an embedded radio module, wherein said computer program product comprises the programming steps of:

sending an inquiry from said server to said first device using said embedded radio modules:

returning, from said first device, a unique device identifier of said first device, to said server;

creating, at said server, a public key, private key pair for said first device;

creating, at said server, a device certificate for said first device, said device certificate having a unique hardware identifier associated with said first device and a public key associated with said first device;

transmitting said private key and said device certificate, and a public key of a Certificate Authority which signed said device certificate, to said first device; and storing said private key in non-removable protected storage at said first device;

wherein said protected storage is write-only storage able to perform computations involving previously-written data;

wherein a copy of said certificate is stored in an LDAP directory.

12. A computer program product embodied in a machine readable medium for initializing a first device distributed with an embedded radio module using a server, said server having an embedded radio module, wherein said computer program product comprises the programming steps of:

sending an inquiry from said server to said first device using said embedded radio modules;

creating, at said first device, a public key, private key pair for said first device;

storing, at said first device, said private key in non-removable protected storage;

returning, from said first device, a unique device identifier and said public key of said first device, to said server;

creating, at said server, a device certificate for said first device, said device certificate having said device identifier and said public key; and transmitting said device certificate and a public key of a Certificate Authority which signed said device certificate to said first device;

wherein said protected storage is a write-only storage able to perform computations involving previously-written data.

13. The method as recited in claim 1, wherein communication between said first device and said server is performed in a wireless manner.

14. The system as recited in claim 5, wherein communication between said first device and said server is performed in a wireless manner.

15. The computer program product as recited in claim 9, wherein communication between said first device and said server is performed in a wireless manner.

16. The computer program product as recited in claim 12, wherein communication between said first device and said server is performed in a wireless manner.

* * * * *